US005084714A

United States Patent [19]

Beaman et al.

[11] Patent Number: 5,084,714

[45] Date of Patent: Jan. 28, 1992

[54] NARROW LED PRINTHEADS AND GRADIENT INDEX LENS ARRAY FOR USE THEREWITH

[75] Inventors: Bryan A. Beaman, Churchville; George F. Holbrook, Pittsford, both of N.Y.

[73] Assignee: Eastman Kodak Company, Rochester, N.Y.

[21] Appl. No.: 619,352

[22] Filed: Nov. 28, 1990

[51] Int. Cl.[5] ........................ G01D 15/14; G02B 6/06

[52] U.S. Cl. ................................ 346/107 R; 385/116

[58] Field of Search ................. 346/107 R; 350/96.15, 350/96.18, 96.25; 355/1

[56] References Cited

U.S. PATENT DOCUMENTS

| | | | |
|---|---|---|---|
| 3,589,795 | 6/1971 | Miyazaki et al. . | |
| 4,068,936 | 1/1978 | Kushima et al. | 355/1 |
| 4,129,372 | 12/1978 | Allgeier | 355/1 |
| 4,176,908 | 12/1979 | Wagner | 350/96.15 |
| 4,318,597 | 3/1982 | Kotani et al. | 355/1 X |
| 4,767,172 | 8/1988 | Nichols et al. | 350/96.18 |
| 4,905,021 | 2/1990 | Iizuka et al. | 346/107 R |
| 4,907,034 | 3/1990 | Doi et al. . | |
| 4,942,405 | 7/1990 | Dody et al. | 346/107 R |

*Primary Examiner*—Benjamin R. Fuller
*Assistant Examiner*—David Yockey
*Attorney, Agent, or Firm*—Norman Rushefsky

[57] ABSTRACT

A light-emitting diode (LED) printhead has associated therewith a gradient index fiber lens array for collecting light from the LED's and focussing same onto a photosensitive surface for recording. The fiber lens array includes a segment that is spaced in overlying relationship to the printhead and has a series of optical fibers for conveying light generally parallel with the plane of the LED's. Various configurations of inputs to said array are described for collecting light from the LED's. The relationship between the array and the printhead provides for a narrow construction allowing space for other recording components to fit more readily about the photosensitive surface.

11 Claims, 2 Drawing Sheets

NARROW LED PRINTHEADS AND GRADIENT INDEX LENS ARRAY FOR USE THEREWITH

BACKGROUND OF THE INVENTION

1. Field of the Invention

The invention relates to non-impact printheads for recording and more particularly to a radiation-emitting printhead having a plurality of recording elements and whose radiation is required to be focussed onto a recording element.

2. Description Relative to the Prior Art

Non-impact printers such as those using light-emitting diodes are well known. In such known printers, one or more extended rows of light-emitting diodes (LED's) are arranged so as to selectively emit light to expose a photosensitive surface to record images. With regard to the recording of images on electrophotographic recording elements such as photoconductive drums, the printheads are required to be placed proximate to the drums. Room must also be provided around the drum for electrostatic chargers, one or more developing stations and transfer devices for transferring images to recording members. In order to provide more compact printers such as those suited for portability and for table top operation, the drum can be made smaller thereby requiring less availability of room for placement of the various members adjacent to the drum surface. The prior art is replete with suggestions for making LED printheads more compact but the suggestions provided by the prior art are far from satisfactory from a manufacturer's point of view in making such printheads. Typically, such printheads in addition to the one or more rows of LED's will include a series of integrated circuit driver chips that are connected to the LED's arranged in a row. The chip arrays may then be assembled end to end to form a single row of several thousand LED's. The driver chips may each include circuitry for receiving data signals and enabling the LED's selectively in accordance with such signals. Each driver chip may be suited for driving one half of the LED's in a chip array so that typically two driver chips are employed for driving a respective chip array of LED's. When these driver chips are mounted to either side of the row of LED chip arrays one group of the driver chips is used to drive odd-numbered LED's and the other group is used to drive even-numbered LED's.

It is preferred from a manufacturing standpoint to mount the driver chips and LED's to a common surface of a support. In one example, it is known to mount three LED chip arrays of say 128 LED's each to a metal or ceramic tile with a corresponding respective number of driver chips for driving even and odd LED's. This assembly forms a module which may be tested and those modules deemed satisfactory may be mounted one after the other upon a printed supporting surface to form the printhead.

One approach noted in the prior art is illustrated in U.S. Pat. No. 4,767,172. In this approach, each LED is centered in a hemispherical cavity in a collector array in order that radiation from the LED enters the collector unrefracted. The collector array includes a convex lens portion and a parabolic reflecting surface portion. Light that exits from the LED that is substantially perpendicular to the substrate supporting the LED is applied to the convex lens and is collimated. Light exiting substantially parallel to the substrate strikes a parabolic reflecting surface at greater than the critical angle and is also collimated. The two concentric collimated beams are combined and applied to a photoreceptor via a light pipe or optical wave guide secured to the collector.

As noted in this patent this recorder is directly used with LED's that form broad light patterns and as such, are used for patch generation and for pitch and edge erasure on the surface of a photoreceptor. In the use of LED's for recording pictorial or alphanumeric images, LED's may be spaced 300 or more to the inch. Providing a lens array as disclosed in the above reference thus represents many difficulties from the manufacturing standpoint.

It is further known, see for example U.S. Pat. No. 4,907,034, to employ a gradient index fiber lens array such as a Selfoc lens, trademark of Nippon Sheet Glass Co., Ltd. to collect light from LED's and focus the light upon a receptor. An advantage of these arrays is that no one particular fiber needs to be registered or aligned with a particular LED. However, the spacing between the LED's and the object side of the lens array needs to be accurately made as well as does spacing between the image side of the array and the surface of the photoreceptor. Any errors in these spacings may be accommodated through the lens depth of focus capability. Light from each LED is collected by groups of fiber and focussed upon the photoreceptor.

Thus, it is an object of the invention to preserve the convenience and desirability of using a gradient index fiber lens array in combination with LED's or other radiation-emitting recording elements in a narrow printhead.

In addition, it is a further object of the invention to preserve the manufacturing convenience of continuing to manufacture LED arrays or other radiation-emitting recording elements and their associated driver chips upon a common surface of a substrate.

It is, therefore, a further object of the present invention to provide a new and improved light collector for radiation from a plurality of recording elements.

Further objects and advantages of the present invention will become apparent as the following description proceeds and the features of novelty characterizing the invention will be pointed out with particularity in the claims annexed to and forming a part of this specification.

SUMMARY OF THE INVENTION

In accordance with the invention, there is provided an apparatus for exposing a photosensitive member, the apparatus comprising a longitudinally extending printhead having a plurality of recording elements supported along the length thereof, driver means for providing driving current to said recording elements, support means for supporting said driver chips and recording elements, said recording elements and said driver means being supported by said support means substantially coplanar. A gradient index fiber lens assembly is provided extending longitudinally with said printhead in spaced overlying relationship therewith and having a series of optical fibers for conveying light generally parallel with the plane of said recording elements.

DETAILED DESCRIPTION OF THE PREFERRED EMBODIMENTS

Figure 1:
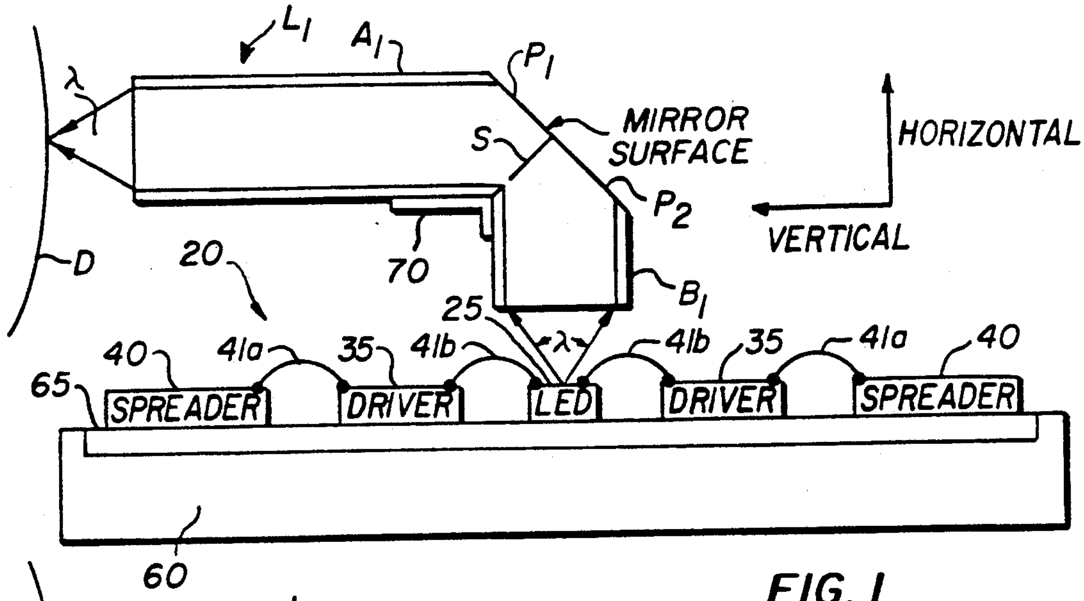
FIG. 1 is a side elevational view in schematic of one embodiment of the invention.

Because electrophotographic reproduction apparatus are well known, the present description will be directed in particular to elements forming part of or cooperating more directly with the present invention. Apparatus not specifically shown or described herein are selectable from those known in the prior art.

In the following description similar reference characters refer to similar elements or members in all of the figures of the drawings.

With reference to FIG. 1, printhead 20 contains a horizontally abutting series of modules. These modules include LED chip arrays 25 and driver chips 35 that are each mounted on a top surface of a tile or plate 65 serving as a support for the module as well as a heat sink. The LED's and driver chips are shown enlarged relative to the other elements of the printhead to facilitate this description. Typically these chips are secured through use of a thin conductive adhesive layer (well known and not specifically shown) that has a good thermal conductance and if required (such as by the diodes) a good electrical conductance and which is applied to the underside of each chip and to appropriate locations on the top surface of the tile plate. The tile plate, in turn, is abutted against the top side edge surface of a base plate serving as a heatsink. A thin layer of conductive thermal paste (not shown) is situated therebetween. To facilitate air cooling, if needed, base plate 60 may have a number of downwardly projecting fins that run along its length. An intermediate plate may also be provided between the base plate and the tile plate. Each module contains, as will be described in detail below, a number, here three, of horizontally aligned LED arrays and accompanying driver circuits coupled together by tape automated bonds or by wire bonds. The diode arrays are situated along a central transverse axis of each module.

To appropriately focus light generated by each individual diode onto a separate corresponding location along a transverse line on a surface of a rotating photoconductor, such as a photoconductive drum, D, a lens, $L_1$, containing a transversely oriented array of optical fibers may be placed over and have a segment thereof in horizontal alignment with the vertically oriented LED arrays which form a horizontally aligned row of LED's. This optical fiber array is preferably a SELFOC graded index optical fiber array manufactured by Nippon Sheet Glass, Limited of Japan (which also owns the trademark SELFOC).

While not shown, an interface board may be mounted to and modified as will be described further below to one end portion of the base plate 60 and contains appropriate input connectors and various signal processing and line driver integrated circuits (all of which are conventional, well known and for simplicity not shown in the figure). Alternatively, the interface board may be mounted along one or both main faces of the base plate 60. The interface board routes via spreader boards to be described appropriate digital data, clock and power signals to each of the modules that forms the printhead in order to energize individual LEDs therein in a proper temporal and positional sequence so as to provide an electrostatic charge pattern on the surface of the photoconductive drum, D, that, during a subsequent toning pass, will produce a desired visual image of alphanumeric or pictorial information on a piece of paper. A suitable termination board (not shown) may be similarly attached to still another end of base plate 60 at the opposite end of the printhead and is connected, also by wire bonds, to the opposite end of the series of spreader boards as is the interface board. The termination board contains well known line terminations, such as resistors or resistor/capacitor pairs or other electronic components, designed to balance the transmission line characteristics of certain individual daisy-chained signal lines which operate at a sufficiently high frequency that, if left unterminated, would suffer from well known unbalanced transmission line effects, such as impedance mismatches and signal reflections. The termination board may also contain power line decoupling capacitors.

Signals to the driver chips from the interface board are distributed through spreader boards 40, two of which are associated with each module. To either side of the odd or even numbered LEDs, a series of vertically oriented spreader boards 40 are connected to each other in a daisy-chained arrangement, using for example wire-bonds or tape automated bonding (TAB). Wire bond pads (henceforth also referred to as "interconnect" pads) are provided along both vertical sides of each spreader board 40 to facilitate the formation of daisy-chain connections using relatively short wire bonds between adjacently situated spreader boards and between a first spreader board and an adjacently situated interface board 50 and between a last spreader board and an adjacently situated termination board. For a more complete discussion of tape automated bonding, the reader is referred to U.S. Pat. No. 4,851,862 issued July 25, 1989 and entitled "LED Array with TAB Bonded Wiring" which is owned by the present assignee and which is incorporated by reference herein. Further description of a printhead with the signal distribution referred to herein may be found in U.S. application Ser. No. 07/455,125, filed in the names of Beaman et al on Dec. 22, 1989, the contents of which are incorporated herein by this reference. These daisy-chained connections are used to distribute digital signals, such as data and clock signals, to the individual drive circuits contained within the module. Wire bond pads are also located along the top edge of each spreader board for use in connecting appropriate drive circuit terminations thereto. To substantially reduce the incidence of current starvation that may occur among individual LEDs along the printhead, power is distributed among the individual modules not by daisy-chained connections extending between adjacent spreader boards but rather through use of bus bars (not shown) that are connected in parallel to all the spreader boards used in both the odd or even halves of the printhead. These bus bars are connected to each spreader board near its bottom edge thereof. Each spreader board includes a multi-layered metalized cross-over wiring pattern that matches a pitch associated with appropriate terminations on the drive circuits to a pitch associated with the daisy-chained wire bond pads. Within each module, the LED chip arrays, illustratively three in number, are mounted directly to the substantially rectangular metallic, typically stainless steel, tile 65 in abutting alignment and along a common central transverse axis of that tile.

Corresponding integrated circuit driver chips 35, illustratively six in number, are also mounted directly to the tile with three such driver chips 35 located on each side of the LED arrays 25. The spreader boards, illustratively two in number, are mounted vertically one on each side edge of the tile 65 outward of the driver circuits. Wire bonds 41*a*, 41*b*, respectively, interconnect the spreader boards 40 with the driver circuits 35 and the driver circuits with the LED arrays 25. The driver circuits and LED arrays 25 are all mounted to a common surface of a tile, with the opposite surface of the tile abutting against the top side edge surface of base plate 60. The printhead will include several thousand LED's arranged in a row which is directed perpendicular to the plane of the Figures shown. Each tile provides a common cathode connection to the LEDs mounted thereon as well as a path with a low thermal resistance (as compared to that possessed by a ceramic tile) to quickly conduct heat from the LED arrays and driver circuits through the tile 65 and into the base plate 60.

The interface board is connected to the first module via its respective spreader board through wire bonds. Similar wire bonds, existing on the other side of spreader board interconnect this spreader board to its neighboring spreader board abuttingly situated thereat for distribution of signals to the next adjacent module. In this fashion, successively occurring modules running towards the rear end of the printhead and the termination board are interconnected with their immediately adjacent neighboring modules through wire bonds situated therebetween such that all the modules in the printhead receive their signals from the daisy-chained spreader boards, with the frontmost and rearmost spreader boards being respectively daisy-chained connected to the interface and termination boards, for purposes of propagating digital data and clock signals thereto from the interface board through all the modules to the termination board. As noted above, only certain data and clock signals that possess a sufficiently high frequency extend past the modules to and are terminated by the termination board. The above-noted three individual bus bars each have a relatively wide cross-sectional shape, as compared to the metalized leads on the spreader boards. Parallel connections are provided between the bus bars and each of the spreader boards to route power signals from the interface board, illustratively two different voltage levels ($V_{cc}$ and $V_{dd}$) and ground, to each of these spreader boards. Identical daisy-chained wire bonds and identical bus bar assemblies are used in both the even and odd halves of the printhead to interconnect the spreader boards therein.

As noted in FIG. 1, a Selfoc lens array, $L_1$, (SLA) has been cut into two segments, $A_1$, $B_1$, respectively, as shown and mated back together where it may be secured along a common surface connection plane S by a suitable transparent adhesive. A mirror is coated upon surfaces $P_1$, $P_2$ of each segment, $A_1$, $B_1$, respectively, which surfaces align so as to be coplanar. Light rays from the LED's are collected by the first segment, $B_1$, of the SLA which is horizontally directed in and out of the plane of the figure. This light is then reflected from the mirrored surface onto the vertically directed segment $A_1$ of the SLA and focussed upon the photoconductive surface of the drum, D. As the LED's are selectively illuminated, based on signals from the driver chips, an appropriate electrostatic latent image is formed by modulation of the uniform electrostatic charge on the drum. This latent image may be developed with electroscopic toner and transferred to plain paper to form a permanent record of the image.

Figure 2:
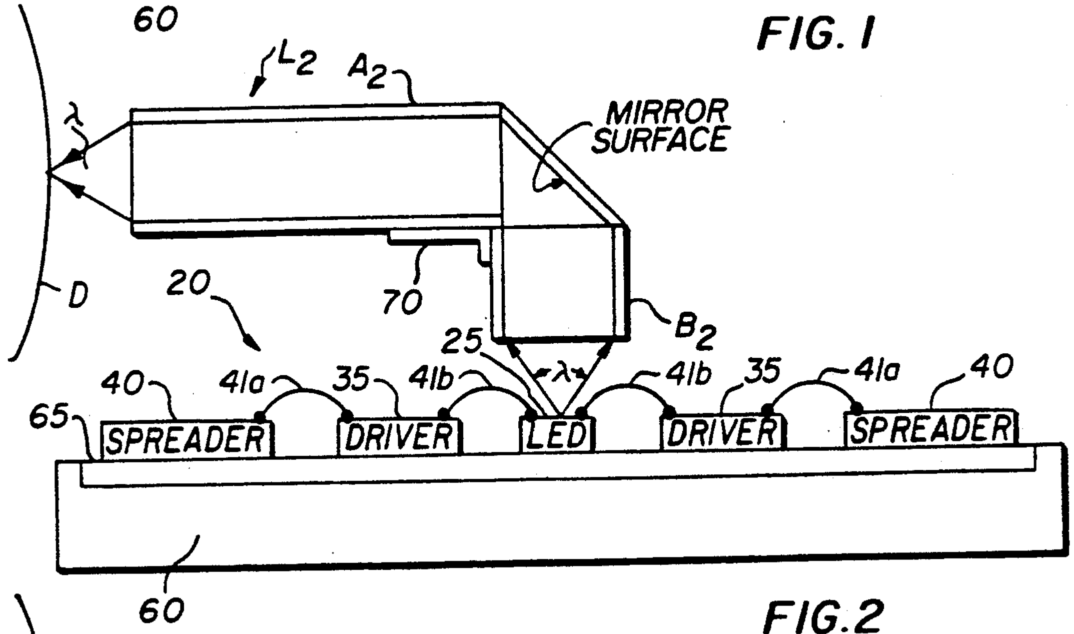
FIG. 2 is a side elevational view in schematic of a second embodiment of the invention.

In the embodiment of FIG. 2, an SLA, $L_2$, has been also divided into two segments, $A_2$, $B_2$, as shown, but in this example a mirror has been placed between the horizontal and vertical segments of the SLA. The mirror directs light exiting from the first segment and directs such light into the second segment. The segments may be supported in the orientation by an angle bracket 70 to which the segments $A_2$ and $B_2$ are adhesively attached. The bracket 70 being attached to the printhead 20 adjacent the ends thereof.

Figure 3:
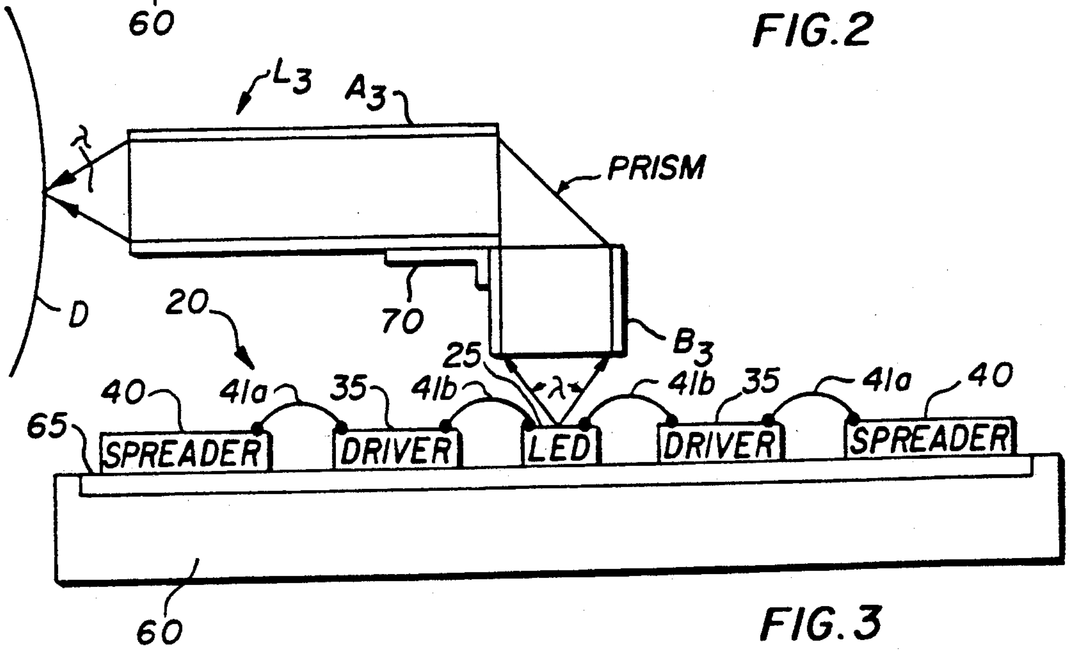
FIG. 3 is a side elevational view in schematic of a third embodiment of the invention.

In the embodiment of FIG. 3 an SLA, $L_3$, has been also divided into two segments $A_3$, $B_3$ as shown but in this example, a prism has been placed between the horizontal and vertical segments of the LSA. The prism directs light exiting from the first segment and directs such light into the second segment. The prism may be secured to an end face of the respective segments of the SLA to secure the assembly without having an air interface.

Figure 4:
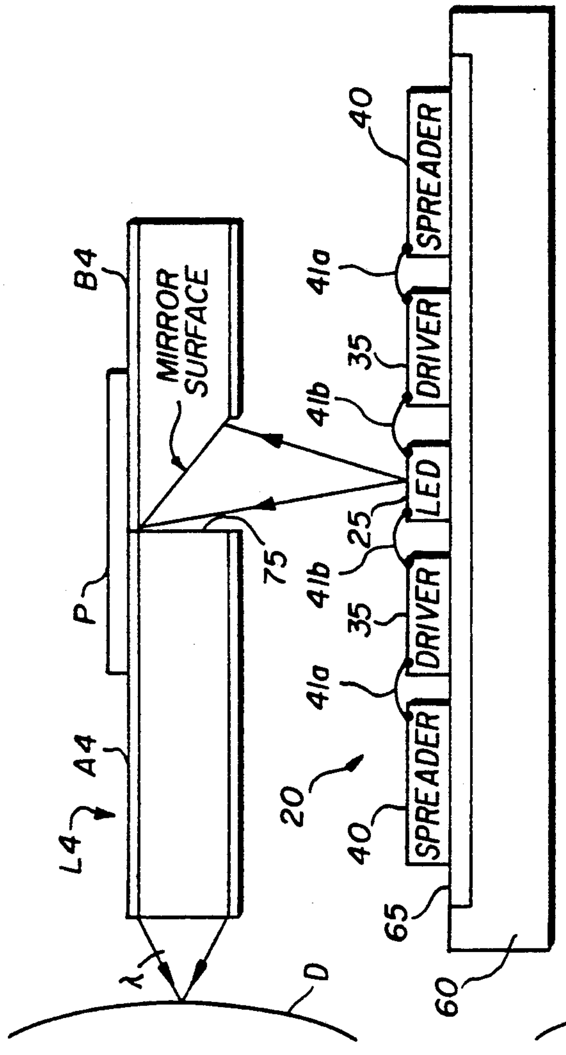
FIG. 4 is a side elevational view in schematic of a fourth embodiment of the invention.

With reference now to the embodiment of FIG. 4, an SLA, $L_4$, has been cut into two segments $A_4$, $B_4$, as shown with one surface of segment $B_4$ being then coated with a mirror. It will be noted that the entire SLA is now oriented vertically and may be positioned closer to the LED's to provide a very narrow printhead construction. The mirrored surface reflects light from the LED's to the input end 75 of the object side of the segment $A_4$.

Figure 5:
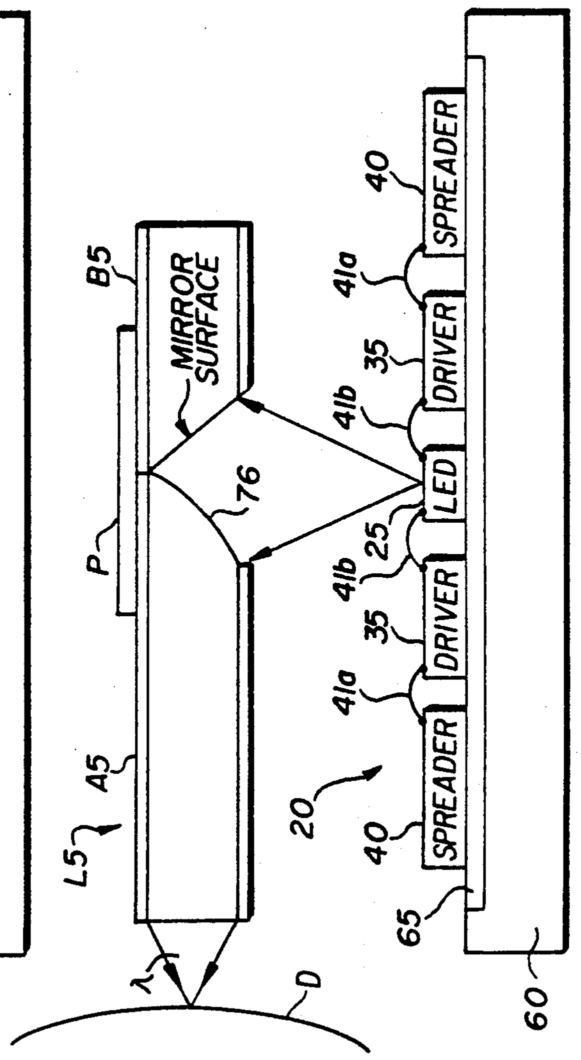
FIG. 5 is a side elevational view in schematic of a fifth embodiment of the invention.

The embodiment of FIG. 5 is similar to that of FIG. 4 except that the input end 76 at the object side of the SLA segment $A_5$ is cut with a convex curvature to enhance light collection. This embodiment also has a mirror surface on segment $B_5$ to reflect light from the LED's into the input end 76 of the SLA. End 76 also collects light directly from the LED's . The segment $A_5$, $B_5$ may be secured by adhesive to a plate P which extends the length of the SLA and is coupled to the printhead 20. Similarly, such a plate may be used on the embodiment of FIG. 4 to secure segments $A_4$, $B_4$.

The invention has been described in detail with particular reference to preferred embodiments thereof, but it will be understood that variations and modifications can be effected within the spirit and scope of the invention.

What is claimed is:

1. An apparatus for exposing a photosensitive member, the apparatus comprising:

a longitudinally extending printhead including a plurality of light-emitting recording elements supported as a row along a longitudinal direction of the printhead, support means for supporting said recording elements in a plane so that said recording elements are substantially coplanar;

a gradient index fiber lens assembly extending longitudinally and in spaced overlying relationship with said printhead and having a series of optical fibers for conveying light from said recording elements in a direction generally parallel with the plane of said recording elements;

and wherein the gradient index lens assembly comprises a first portion having a series of parallel fibers extending in a first direction and having ends shaped to form a first inclined surface inclined with respect to said first direction and coated with a mirror, and a second series of parallel fibers extending in said first direction and having ends shaped to form a second inclined surface inclined with respect to said first direction and to said first inclined surface; and a second portion having a third series of parallel fibers extending in a second direction inclined with respect to said first direction and having ends shaped to form a third inclined surface and coated with a mirror, and a fourth series of parallel fibers extending in said second direction and having ends shaped to form a fourth inclined surface, the second and fourth inclined surfaces being adhesively secured and the first and third inclined surfaces being coplanar.

2. The apparatus of claim 1 and wherein the recording elements are light-emitting diodes.

3. The apparatus of claim 1 and wherein the printhead includes a plurality of driver chips and a spreader board supported on said support means so as to be substantially coplanar with said recording elements, said spreader board having a circuit for conveyance of signals to said driver chips.

4. An apparatus for exposing a photosensitive member, the apparatus comprising:

a longitudinally extending printhead including a plurality of light-emitting recording elements supported as a row along a longitudinal direction of the printhead, support means for supporting said recording elements in a plane so that said recording elements are substantially coplanar;

a gradient index fiber lens assembly extending longitudinally and in spaced overlying relationship with said printhead and having a series of optical fibers for conveying light from said recording elements in a direction generally parallel with the plane of said recording elements;

and wherein said series of optical fibers of the gradient index fiber lens assembly includes an input end for receiving light from said recording elements directly and a mirror means for redirecting additional light from said recording elements into said input end.

5. The apparatus of claim 4 and wherein the recording elements are light-emitting diodes.

6. The apparatus of claim 4 and wherein the input end of said series of parallel fibers have ends arranged along a convex curvature and the mirror means comprises a surface that is spaced from said ends.

7. The apparatus of claim 6 and wherein the recording elements are light-emitting diodes.

8. The apparatus of claim 4 and wherein the input end of said fibers have ends arranged along a convex curvature.

9. The apparatus of claim 8 and wherein the recording elements are light-emitting diodes.

10. An apparatus for exposing a photosensitive member, the apparatus comprising:

a longitudinally extending printhead including a plurality of light-emitting recording elements supported as a row along a longitudinal direction of the printhead, support means for supporting said recording elements in a plane so that said recording elements are substantially coplanar; and a gradient index fiber lens assembly extending longitudinally and in spaced overlying relationship with said printhead and having a series of optical fibers for conveying light from said recording elements in a direction generally parallel with the plane of said recording elements;

said including mirror means for redirecting light from said recording elements into an input end of said assembly.

11. The apparatus of claim 10 and wherein the recording elements are light-emitting diodes.

* * * * *